United States Patent
Nakata

(10) Patent No.: US 6,385,206 B1
(45) Date of Patent: *May 7, 2002

(54) COMMUNICATION NETWORK AND METHOD, AND NODE AND EXCHANGE NODE USED THEREIN

(75) Inventor: Toru Nakata, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/675,413

(22) Filed: Jul. 2, 1996

(30) Foreign Application Priority Data

Jul. 3, 1995 (JP) .............................. 7-189784

(51) Int. Cl.[7] .............................................. H04L 12/44
(52) U.S. Cl. ...................... 370/407; 370/408; 370/425; 370/524; 340/825.02; 359/124
(58) Field of Search ................................ 370/225, 227, 370/228, 254, 256, 386, 388, 389, 400, 407, 408, 422, 425, 438, 446, 522, 524; 340/825.01, 825.02, 825.03; 359/115, 118, 120, 121, 124, 127, 128

(56) References Cited

U.S. PATENT DOCUMENTS

| 4,797,879 A | * | 1/1989 | Habbab et al. | 370/425 |
| 5,159,594 A | * | 10/1992 | Bales et al. | 370/409 |
| 5,182,751 A | * | 1/1993 | Bales et al. | 370/524 |
| 5,241,409 A | * | 8/1993 | Hill et al. | 359/128 |
| 5,351,146 A | * | 9/1994 | Chan et al. | 370/408 |
| 5,452,115 A | * | 9/1995 | Tomioka | 359/123 |
| 5,513,182 A | * | 4/1996 | Kawamura et al. | 370/407 |
| 5,748,625 A | * | 5/1998 | Hashimoto | 370/353 |

* cited by examiner

*Primary Examiner*—Alpus H. Hsu
(74) *Attorney, Agent, or Firm*—Fitzpatrick, Cella, Harper & Scinto

(57) ABSTRACT

In a communication network of the present invention, there are arranged a plurality of groups of nodes, a plurality of exchange nodes, a plurality of first transmission lines connecting the node groups with respective ones of the exchange nodes, and at least a second transmission line for connecting the exchange nodes with each other. The nodes are connected with each other through at least one of the exchange nodes by multiplexed communication channels for transmission of a data signal established in the first and second transmission lines, and the nodes are connected with the exchange nodes by the multiplexed communication channels and at least one control channel for transmission of a control signal.

20 Claims, 4 Drawing Sheets

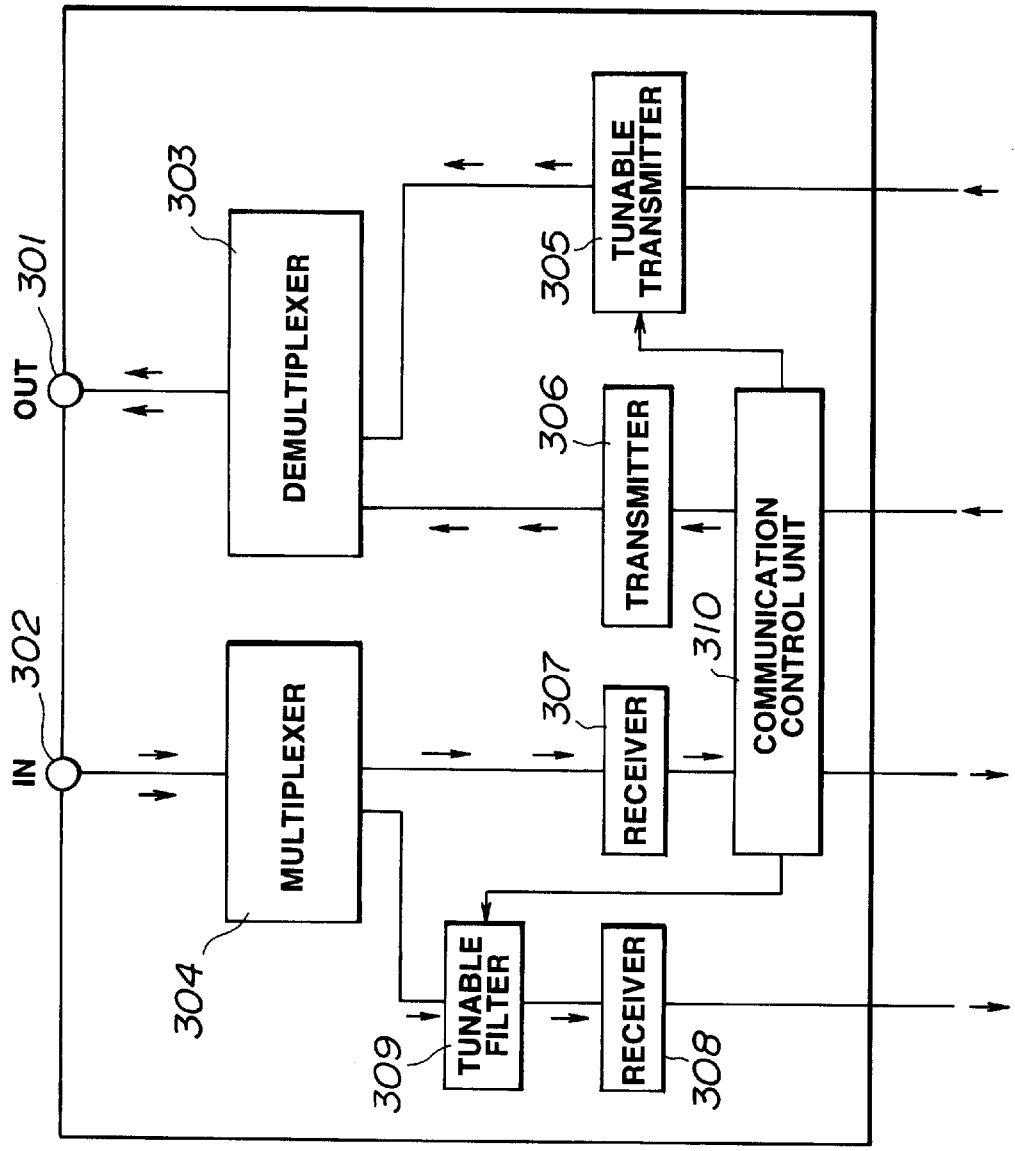

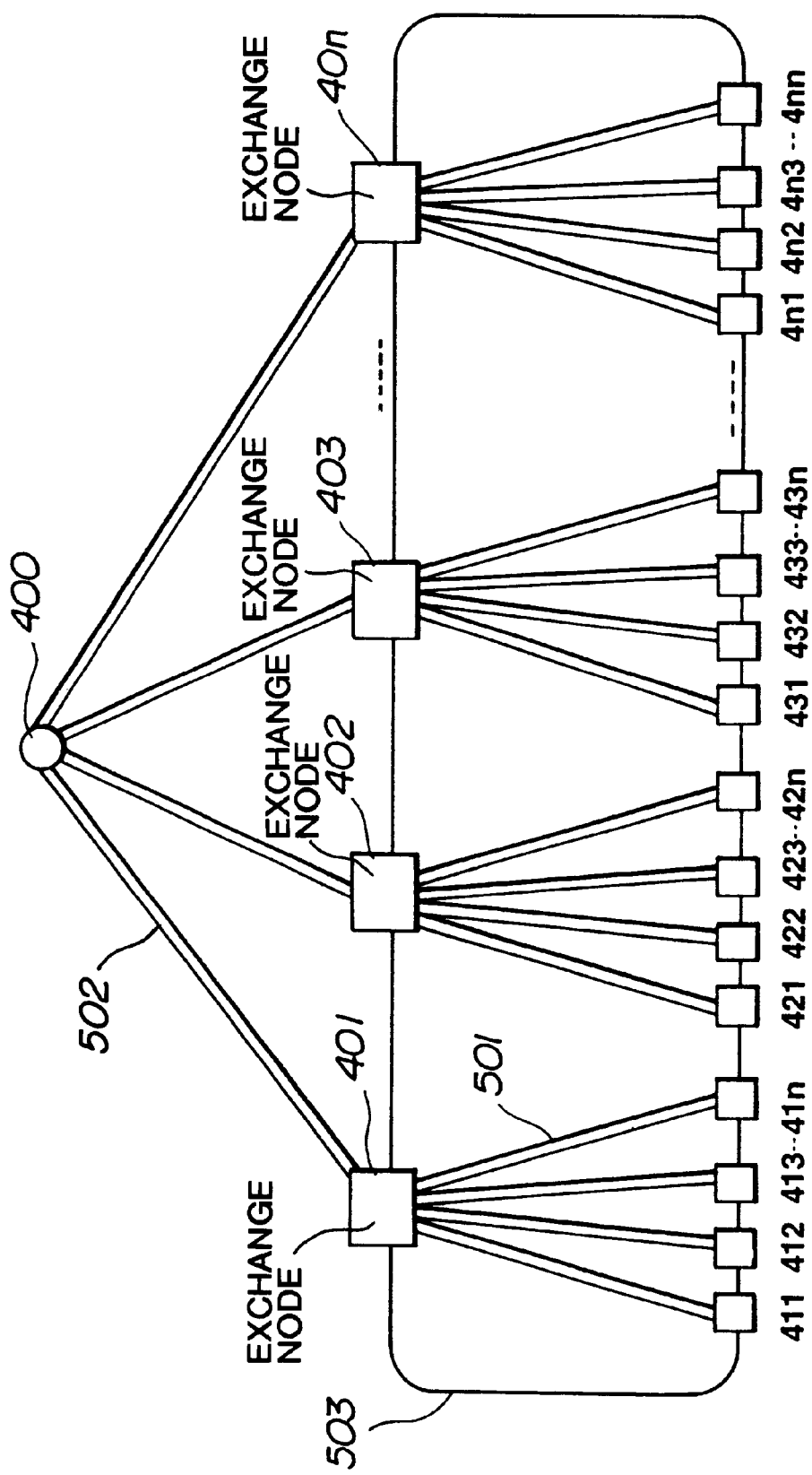

COMMUNICATION NETWORK AND METHOD, AND NODE AND EXCHANGE NODE USED THEREIN

BACKGROUND OF THE INVENTION

1. Field of the Invention

The present invention relates to a communication network or system, and to a communication method in which a plurality of nodes use a plurality of signal channels in common. More particularly, the present invention relates to a channel (wavelength or the like) division mutiplexing network and the like which are extended, for example, by connecting a plurality of groups of nodes with each other.

2. Related Background Art

Conventionally, a tree-type network is generally known. In a network system, such as a tree-type, in which the system is constructed in a multi-stage manner, however, a control method for performing channel multiplexing communication has been unknown so far.

SUMMARY OF THE INVENTION

It is an object of the present invention to provide a communication network, a communication method in which a control channel is disposed between nodes and exchange nodes and channel assignment or selection of a vacant channel is conducted, using at least the control channel, to perform communication, and a node used therein.

It is another object of the present invention to provide a communication network and a communication method in which control channels are disposed in a parallel manner between nodes and each exchange node, the control channel is multiplexed with multiplexed communication channels such that the configuration of transmission lines is simplified, the channel assignment is effected by using the control channel and the multiplexed communication channels such that communication operation is simplified and the time required for establishing a series of communication channels, through which communication is performed between a signal transmitting node and a signal receiving node, is shortened, and to provide a node used therein.

The objects of the present invention are achieved by the following communication networks, communication methods, and nodes and exchange nodes used in those communication networks.

According to one aspect of the present invention, there is provided a communication network which includes: a plurality of groups of nodes, each of the node groups including at least a node; a plurality of exchange nodes, each of the exchange nodes being connected to each one of the node groups; a plurality of first transmission lines for connecting each of the node groups with each one of the exchange nodes; and at least a second transmission line for connecting the exchange nodes with each other, and in which the nodes are connected with each other through at least one of the exchange nodes by multiplexed communication channels for transmission of a data signal established in the first and second transmission lines, and the nodes are connected with the exchange nodes by the multiplexed communication channels and at least one control channel for transmission of a control signal.

More specifically, the following constructions are possible:

The nodes in each group are connected with each of the exchange nodes by the multiplexed communication channels and at least one control channel established in the first transmission line in a parallel manner, and one of the exchange nodes serves as a channel management node for selecting or assigning a using or vacant channel to be used, from the multiplexed communication channels (corresponding to a first embodiment described below).

There is further arranged a third transmission line for connecting the nodes and the exchange nodes with each other in a loop form, the nodes in each node group are connected with each one of the exchange nodes by the muliplexed communication channels in a parallel manner, the nodes and the exchange nodes are serially connected with each other by the control channel established in the third transmission line, and one of the nodes and the exchange nodes serves as a channel management node for selecting or assigning a using channel to be used, from the multiplexed communication channels (corresponding to a second embodiment described below).

The exchange node is constructed such that a using channel (i.e., the channel to be used from among the multiplexed communication channels) can be exchanged for another in the exchange node. The control channel serves to transmit the control signal including data of at least one of a signal transmission channel in which the data signal is transmitted from a transmitting node of the nodes, a signal receiving channel in which the data signal is transmitted to a receiving node of the nodes, and communication start information for informing that communication is to be started. The multiplexed communication channels serve to transmit the data signal including data of an address of a receiving node to which the data signal is to be transmitted (corresponding to a first embodiment described below).

Each of the nodes performs communication with the exchange node connected with that node through the control channel, and the nodes perform communication with each other through at least one selected or assigned using channel of the multiplexed communication channels (corresponding to a first embodiment described below).

Each of the nodes performs communication with the channel management node through the control channel in a loop form, and the nodes perform communication with each other through at least one selected or assigned using channel of the multiplexed communication channels (corresponding to a second embodiment described below).

Each of the nodes includes a communication control unit for performing communication of the control signal including data of at least one of a signal transmission channel in which the data signal is transmitted from a transmitting node of the nodes, a signal receiving channel in which the data signal is transmitted to a receiving node of the nodes, and communication start information for informing that communication is to be started, a unit for transmitting the data signal to at least one channel of the multiplexed communication channels and a unit for receiving the data signal transmitted through at least one channel of the multiplexed communication channels. Each of the exchange nodes includes a communication control unit for performing communication of the control signal including data of at least one of a signal transmission channel in which the data signal is transmitted from a transmitting node of the nodes, a signal receiving channel in which the data signal is transmitted to a receiving node of the nodes, and communication start information for informing that communication is to be started, with the nodes and the other exchange nodes connected with that exchange node, a unit for monitoring a situation of used channels of the multiplexed communication channels, input terminals, output terminals and a unit for connecting a signal input into the input terminal through the multiplexed communication channel to at least one of the output terminals (corresponding to a first embodiment described below).

Each of the exchange nodes includes a unit for performing communication of the control signal including data of at least one of a signal transmission channel in which the data signal is transmitted from a transmitting node of the nodes, a signal receiving channel in which the data signal is transmitted to a receiving node of the nodes, and communication start information, with the nodes and the other exchange nodes connected with that exchange node, a unit for monitoring a situation of used channels of the multiplexed communication channels, input terminals, output terminals, a unit for connecting a signal input into the input terminal through the multiplexed communication channel to at least one of the output terminals and an exchange unit for exchanging the using channel for another or for converting a signal transmitted through one of the multiplexed channels to a signal to be transmitted through another channel (corresponding to a first embodiment described below).

The channel management node includes a unit for performing communication of the control signal including data of at least one of a signal transmission channel in which the data signal is transmitted from a transmitting node of the nodes, a signal receiving channel in which the data signal is transmitted to a receiving node of the nodes, and communication start information, with the nodes and the other exchange nodes and a unit for monitoring a situation of used channels of the multiplexed communication channels (corresponding to a second embodiment described below).

The exchange node includes input terminals, output terminals, a unit for connecting a signal input into the input terminal through the multiplexed communication channel to at least one of the output terminals and an exchange unit for exchanging the using channel for another or for converting a signal transmitted through one of the multiplexed channels to a signal transmitted through another channel (corresponding to a second embodiment described below).

The transmission lines comprise light transmission lines, and the multiplexed channels comprise wavelength division multiplexed channels to establish a wavelength division multiplexing communication network. The exchange node exchanges a wavelength of a signal for another among the wavelength division multiplexed channels. The multiplexed communication channels are separated from the control channel, spatially or using a plurality of wavelengths assigned to the respective channels.

According to another aspect of the present invention, there is provided a communication method performed in the above-discussed communication networks, in which a transmitting node of the nodes transmits a communication demand or request to the exchange node connected with the transmitting node, using the control channel, the exchange node notifies the transmitting node of a vacant or assigned channel of the multiplexed communication channels, using the control channel, the transmitting node transmits a data signal including at least an address of a receiving node of the nodes through the notified vacant channel, the exchange node connected with the receiving node detects the address of the receiving node from the data signal, and the exchange node notifies the receiving node of a signal receiving vacant channel of the multiplexed communication channels, through which the data signal is to be transmitted from the exchange node to the receiving node, using the control channel, to establish a series of communication channels through which the data signal is transmitted from the transmitting node to the receiving node (corresponding to a first embodiment described below).

According to still another aspect of the present invention, there is provided a communication method performed in the above-discussed communication networks, in which a transmitting node of the nodes transmits a communication demand to the channel management node connected with the transmitting node, using the control channel, the channel management node notifies at least one of the transmitting node and a receiving node of the nodes of at least one vacant channel of the multiplexed communication channels, using the control channel, and the transmitting node transmits a data signal to the receiving node through the at least one notified vacant channel (corresponding mainly to a second embodiment described below). The channel management node may further notify the exchange node of a vacant channel of the multiplexed communication channels or a type of communication, using the control channel.

According to still another aspect of the present invention, there is provided a communication method performed in the above-discussed communication networks, in which a transmitting node of the nodes transmits a data signal including at least an address of a receiving node of the nodes to a pre-assigned channel of the multiplexed communication channels which is assigned to the transmitting node beforehand, the exchange node connected with the receiving node detects the address of the receiving node from the received data signal, and the exchange node connected to the receiving node notifies the receiving node of a signal receiving vacant channel of the multiplexed communication channels, through which the data signal is to be transmitted from the exchange node to the receiving node, using the control channel, to establish a series of communication channels through which the data signal is transmitted from the transmitting node to the receiving node (corresponding to a third embodiment described below).

According to still another aspect of the present invention, there is provided a communication method performed in the above-discussed communication networks, in which a transmitting node of the nodes transmits a communication demand to the exchange node connected with the transmitting node, using the control channel, the exchange node notifies the transmitting node of a vacant or assigned channel of the multiplexed communication channels, using the control channel, the transmitting node transmits a data signal including at least an address of a receiving node to the notified vacant channel, the exchange node connected with the receiving node detects the address of the receiving node from the data signal, and the exchange node relays the data signal to the receiving node through a pre-assigned channel of the multiplexed communication channels, which is assigned to the receiving node beforehand, to establish a series of communication channels through which the data signal is transmitted from the transmitting node to the receiving node (corresponding to a fourth embodiment described below).

According to still another aspect of the present invention, there is provided a communication method performed in the above-discussed communication networks, in which a transmitting node of the nodes transmits a communication demand to the exchange node connected with the transmitting node, using the control channel, the exchange node notifies the transmitting node of a vacant or assigned channel of the multiplexed communication channels, using the control channel, the exchange node selects or assigns a vacant channel of the multiplexed communication channels to the exchange node connected with a receiving node, the transmitting node transmits a data signal including at least an address of the receiving node to the notified vacant channel, the exchange node connected with the transmitting node relays the data signal to the selected vacant channel, the exchange node connected with the receiving node selects or assigns a vacant channel of the multiplexed communication channels to the receiving node, the exchange node detects the address of the receiving node, and the exchange node notifies the receiving node of the selected vacant channel to the receiving node, using the control channel, to establish a series of communication channels through which the data signal is transmitted from the transmitting node to the receiving node (corresponding to a first embodiment described below).

According to still another aspect of the present invention, there is provided a communication method performed in the above-discussed communication networks, in which a transmitting node of the nodes transmits a communication demand to the exchange node connected with the transmitting node, using the control channel, the exchange node selects or assigns a vacant channel of the multiplexed communication channels to the exchange node connected with a receiving node, the transmitting node transmits a data signal including at least an address of the receiving node to a pre-assigned channel of the multiplexed communication channels, the exchange node relays the data signal to the selected vacant channel to the exchange node connected with the receiving node, the exchange node connected with the receiving node selects a vacant channel of the multiplexed communication channels to the receiving node, the exchange node detects the address of the receiving node, and the exchange node notifies the receiving node of the selected vacant channel to the receiving node, using the control channel, to establish a series of channels through which communication is performed from the transmitting node to the receiving node (corresponding to a third embodiment described below).

According to still another aspect of the present invention, there is provided a communication method performed in the above-discussed communication networks, in which a transmitting node of the nodes transmits a communication demand to the exchange node connected with the transmitting node, using the control channel, the exchange node notifies the transmitting node of a vacant channel of the multiplexed communication channels, using the control channel, the exchange node selects a vacant channel of the multiplexed communication channels to the exchange node connected with the receiving node, the transmitting node transmits a data signal including at least an address of the receiving node to the assigned or assigned vacant channel, the exchange node relays the data signal to the selected vacant channel, the exchange node connected with the receiving node detects the address of the receiving node from the data signal, and the exchange node transmits the data signal to the receiving node through a pre-assigned channel of the multiplexed communication channels, which is assigned to the receiving node beforehand, to establish a series of channels through which communication is performed from the transmitting node to the receiving node (corresponding to a fourth embodiment).

According to still another aspect of the present invention, there is provided a communication method performed in the above-discussed communication networks, in which a transmitting node of the nodes transmits a communication demand to the exchange node connected with the transmitting node or the channel management node, using the control channel, the exchange node or the channel management node notifies the transmitting node of a vacant channel of the multiplexed communication channels, using the control channel, the exchange node connected to a receiving node or the channel management node notifies the receiving node of a signal receiving channel of the multiplexed communication channels, through which the data signal is to be transmitted from the exchange node to the receiving node, using the control channel, and the transmitting node transmits a data signal to the receiving node through the notified vacant channel to establish a series of channels through which communication is performed from the transmitting node to the receiving node.

More specifically, the following constructions are possible in the above communication methods:

The exchange node connected with the transmitting node transmits the signal including at least the address to the exchange node connected with the receiving node, through the vacant channel of the multiplexed communication channels, the exchange node connected with the receiving node detects the address of the receiving node from the signal and notifies the receiving node of the receiving channel, using the control channel, to establish the series of channels, the exchange node connected with the receiving node then returns the signal including the address to the exchange node connected with the transmitting node, through another vacant channel of the multiplexed communication channels, the exchange node connected with the transmitting node notifies the transmitting node of the return, using the control channel, and then the transmitting node stops the transmission of the signal including the address and starts to perform communication to the receiving node (corresponding to a first embodiment described below).

When communication is performed between the nodes connected with the same exchange node, the transmitting node transmits the communication demand to the exchange node connected with the transmitting node, using the control channel, the exchange node notifies each of the transmitting node and the receiving node of each vacant channel of the multiplexed communication channels, using each control channel, the transmitting node transmits the data signal to the notified vacant channel, the exchange node relays the data signal to the receiving node, and the receiving node receives the data signal through the notified vacant channel (corresponding to a first embodiment described below).

When communication is performed between the nodes connected with the same exchange node, the transmitting node transmits the communication demand to the exchange node connected with the transmitting node, using the control channel, the exchange node notifies the receiving node of the receiving channel, using the control channel, the transmitting node transmits the data signal to the pre-assigned channel, the exchange node relays the data signal to the receiving node, and the receiving node receives the data signal through the notified receiving channel (corresponding to a third embodiment described below).

When communication is performed between the nodes connected with the same exchange node, the transmitting node transmits the communication demand to the exchange node connected with the transmitting node, using the control channel, the exchange node notifies the transmitting node of communication allowance, using the control channel, only when the receiving node is not in communication with another node, the transmitting node transmits the data signal to the pre-assigned channel of the receiving node, the exchange node relays the data signal to the receiving node, and the receiving node receives the data signal through the pre-assigned receiving channel (corresponding to a fourth embodiment described below).

The signal including the address of the receiving node may be a repetitive signal.

These advantages and others will be more readily understood in connection with the following detailed description of the preferred embodiments in conjunction with the drawings.

BRIEF DESCRIPTION OF THE DRAWINGS

FIG. 3 is a view illustrating the construction of a node in the first embodiment of a communication network according to the present invention.

FIG. 4 is a view illustrating the network construction of a second embodiment of a communication network according to the present invention.

DESCRIPTION OF THE PREFERRED EMBODIMENTS

First Embodiment

Figure 1:
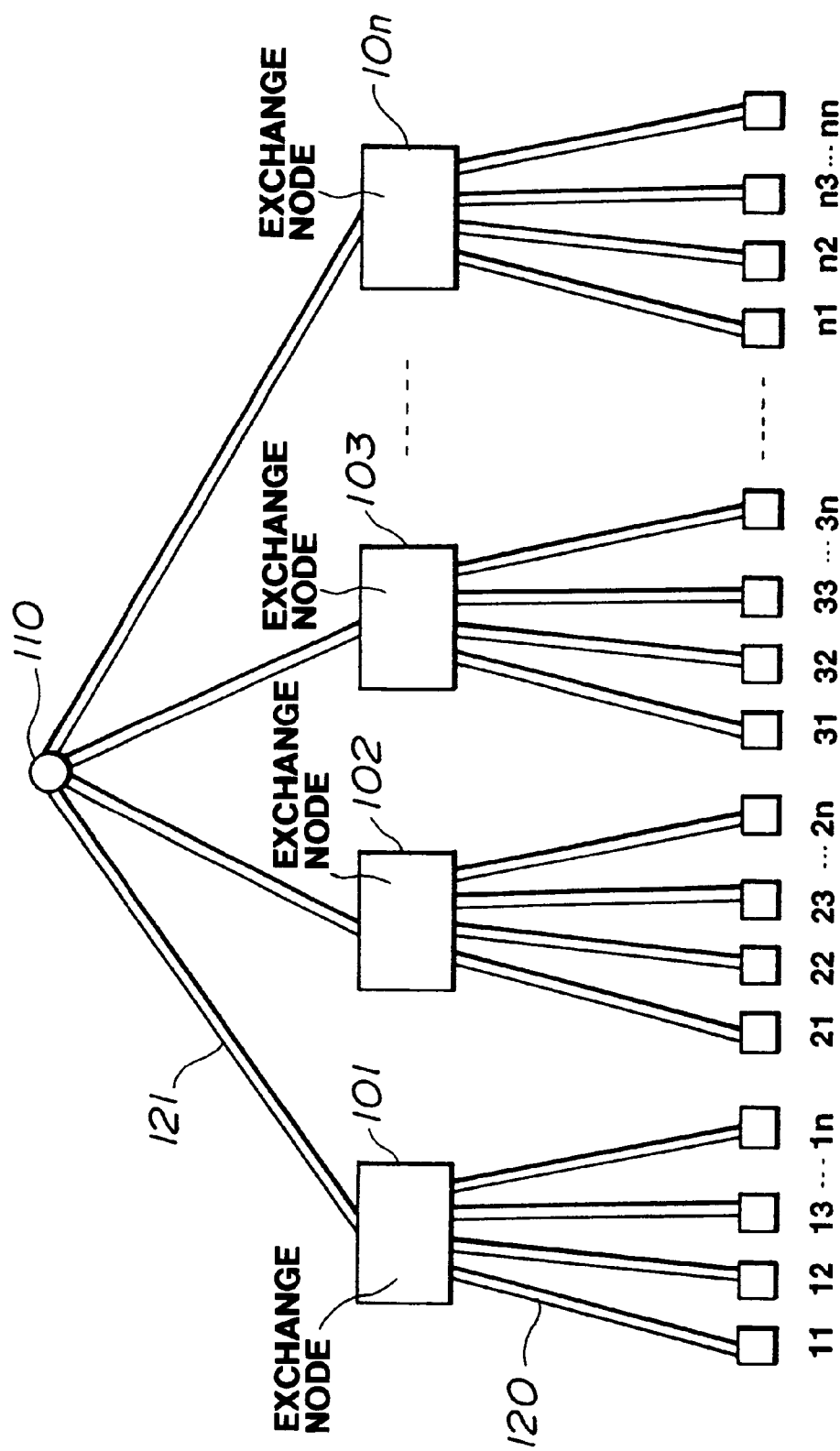
FIG. 1 is a view illustrating the network construction of a first embodiment of a communication network according to the present invention.
Figure 2:
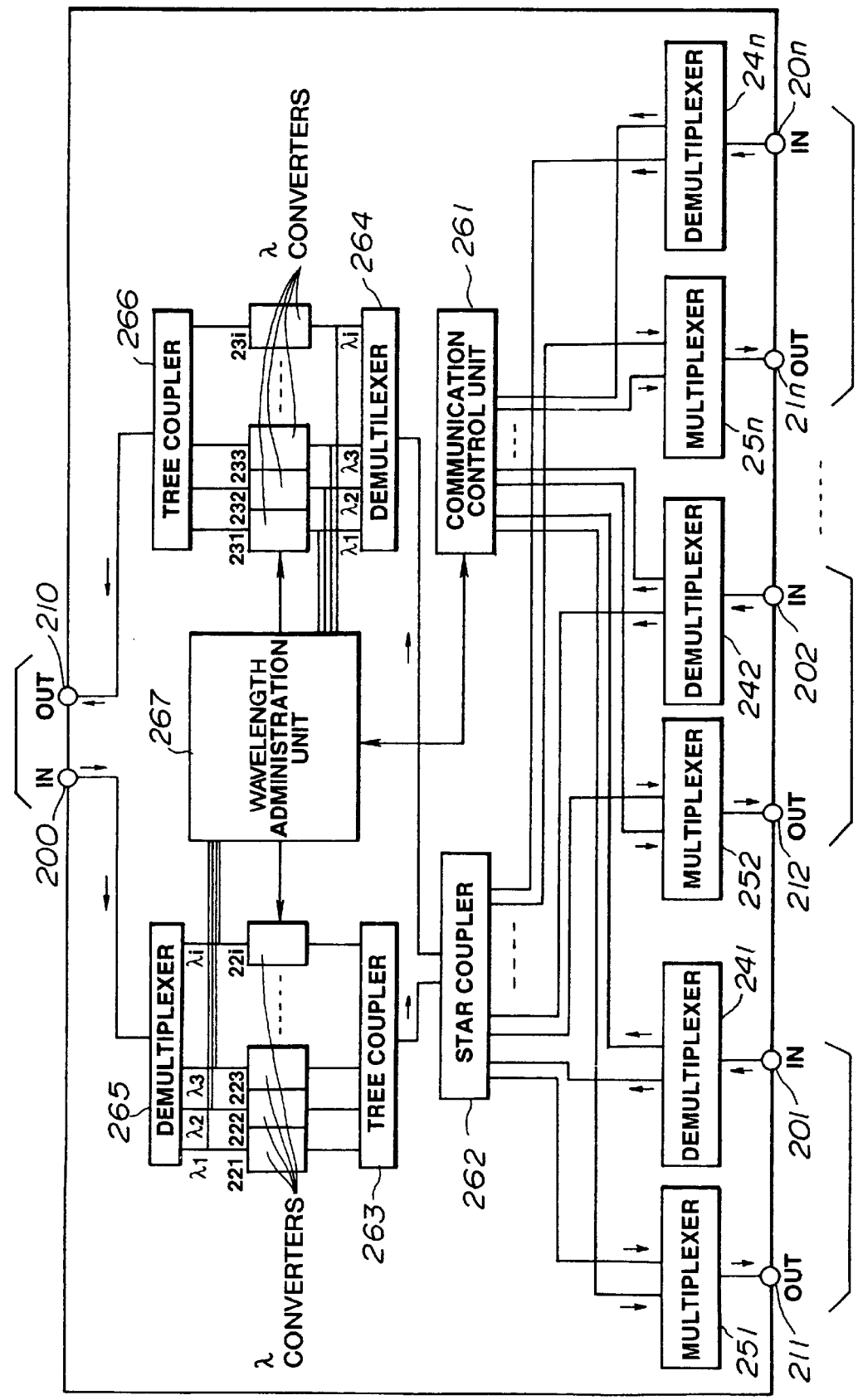
FIG. 2 is a view illustrating the construction of an exchange node in the first embodiment of a communication network according to the present invention.

A first embodiment of the present invention will be described with reference to FIGS. 1 through 3. FIG. 1 illustrates the structure or configuration of a network, FIG. 2 illustrates the structure of an exchange node for managing and changing a using channel among multiplexed channels, and FIG. 3 illustrates the structure of a node.

The configuration of the network of the first embodiment will be described initially. In FIG. 1, reference numerals 11, 12, ..., $nn_n$ respectively designate nodes, reference numerals 101, 102, ..., 10n respectively designate exchange nodes and reference numeral 110 designates a star coupler. Each group of the nodes 11–$nn_n$ is connected with a respective one of the exchange nodes 101–10n through up and down optical fibers or transmission lines 120, and the exchange nodes 101–10n are further connected with the star coupler 110 through up and down optical fibers or transmission lines 121. In this wavelength division multiplexing network, communication is performed among the respective groups of the nodes (for example, in the group of the nodes 11–$1n_1$) which are located downstream of the exchange nodes 101–10n, using channels of wavelengths $\lambda_1$–$\lambda_1$ in the fiber transmission lines 120 and 121 (the number i of the multiplexed wavelengths is preferably about over ⅕ of the number $(n_1, n_2, \ldots, n_n)$ of the nodes in each node group, though this number may vary depending on communication frequency). Communication is also performed among the exchange nodes 101–10n, using i channels of wavelengths in the fiber transmission lines 121. In addition to the communication channels, a control channel for controlling the communication channels is provided between each of the exchange nodes 101–10n and each of the nodes 11–$nn_n$. In the control channel in the fiber transmission lines 120, communication is conducted using a wavelength $\lambda_a$ which differs from the wavelengths $\lambda_1$–$\lambda_1$, of the communication channels.

The numbers $(n_1, n_2, \ldots, n_n)$ of the nodes in the respective node groups and the number n of the exchange nodes may be equal to or different from each other.

The structure of the exchange nodes 101–10n will now be described. In FIG. 2, reference numerals 200–20$n_k$ designate input terminals of the exchange node. Reference numerals 210–21$n_k$ (k=1, ..., n) designate output terminals of the exchange node. Reference numerals 241–24$n_k$ designate demultiplexers for separating optical signals in two wavelength regions of $\lambda_a$ and $\lambda_1$–$\lambda_1$ from each other. Reference numerals 251–25$n_k$ designate multiplexers or combiners for combining optical signals in two wavelength regions of $\lambda_a$ and $\lambda_1$–$\lambda_1$. Reference numeral 261 designates a communication control unit for performing communication among the nodes 11–$nn_n$, using the control channel of the wavelength $\lambda_a$. Reference numeral 262 designates a star coupler. Reference numerals 263 and 266 designate tree couplers. Reference numerals 264 and 265 designate demultiplexers for separating optical signals at $\lambda_1$–$\lambda_1$ in the communication channels from each other. Reference numeral 267 designates a wavelength administration or management unit for detecting an address of the optical signal and managing wavelengths of the communication channels to be used in the network. Reference numerals 221–22i and 231–23i designate wavelength converters for converting an input optical signal to an optical signal at a desired wavelength out of the wavelengths $\lambda_1$–$\lambda_1$. As the wavelength converters 221–22i and 231–23i, conventional wavelength converting lasers or the like can be used. Also, as to other devices discussed above, such as the demultiplexers 241–24$n_k$, 264 and 265, conventional devices can be used likewise.

The structure of the nodes 11–$nn_n$ will now be described. In FIG. 3, reference numeral 301 designates an output terminal of the node. Reference numeral 302 designates an input terminal of the node. Reference numeral 303 designates a multiplexer or combiner for combining optical signals in the two wavelength regions of $\lambda_a$ and $\lambda_1$–$\lambda_1$. Reference numeral 304 designates a demultiplexer for separating optical signals in the two wavelength regions of $\lambda_a$ and $\lambda$–$\lambda_1$ from each other. Reference numeral 305 designates a tunable optical transmitter for transmitting an optical signal at any of the wavelengths $\lambda_1$–$\lambda_1$ in the communication channels. Reference numeral 306 designates an optical transmitter for transmitting an optical signal at the wavelength $\lambda_a$ in the control channel. Reference numerals 307 and 308 designate optical receivers. Reference numeral 309 designates a tunable filter for transmitting an optical signal at any of the wavelengths $\lambda_1$–$\lambda_1$ therethrough. Reference numeral 310 designates a communication control unit for performing communication with the exchange nodes 101–10n using the control channel and controlling the tunable transmitter 305 and the tunable filter 309.

The communication operation of the network of this embodiment will now be described with reference to FIGS. 1–3.

The communication operation in the control channel will be described initially. Each node 11–$nn_n$ performs one-to-one communication with the exchange node 101–10n connected therewith through the up and down transmission lines 120. For example, when communication is to be performed from the node 11 to the exchange node 101, the communication control unit 310 in the node 11 supplies a data signal, which is provided from a terminal connected with the node 11, to the optical transmitter 306, and the data signal is converted to an optical signal at the wavelength $\lambda_a$ therein and output therefrom. The output optical signal is transmitted to the up optical fiber 120 through the multiplexer 303 and the output terminal 301. The optical signal is transmitted through the up optical fiber 120 and input into the input terminal 201 of the exchange node 101. Then, the optical signal is demultiplexed by the demultiplexer 241 and received by the communication control unit 261. (In FIG. 2, the receiver in the communication control unit 261 is omitted from the illustration)

When communication is performed from the exchange node 101 to the node 11, the communication control unit 261 in the exchange node 101 supplies an optical signal at the wavelength $\lambda_a$ (in FIG. 2, the transmitter in the communication control unit 261 is omitted from the illustration). The output optical signal is transmitted to the down optical fiber 120 through the multiplexer 251 and the output terminal 211. The optical signal is transmitted through the down optical fiber 120 and input into the input terminal 302 of the node 11. Then, the optical signal is demultiplexed by the demultiplexer 304 and received by the optical receiver 307. The received signal is notified to the terminal equipment connected with the node 11, through the communication control unit 310. Thus, communication in the control channel is carried out between the node 11 and exchange node 101 through the up and down transmission lines or optical fibers 120. Communication in the control channel between other nodes and exchange nodes is performed through the up and down transmission lines 120, similarly.

The communication operation in the communication channels will now be described. Each node $11-nn_n$ conducts communication, using the wavelengths $\lambda_1-\lambda_1$ in common, in each node group. Therefore, each node $11-nn_n$ conducts wavelength assignment prior to communication. The wavelength assignment is performed under the control of the wavelength management unit 267 in each exchange node $101-10n$. Optical signals at respective wavelengths $\lambda_1-\lambda_1$ input through the input terminals $201-20n_k$ of each exchange node are transmitted through the demultiplexers $241-24n_k$ and the star coupler 262, and demultiplexed by the demultiplexer 264. The wavelength management unit 267 makes up a lower-stream wavelength management table based on the thus-input optical signals at respective wavelengths, and accordingly administrates lower-stream communication wavelengths (the lower-stream refers to a portion of the system downstream of the exchange node (i.e., on the side of the nodes)). Likewise, wavelength-multiplexed signals input through the input terminal 200 are demultiplexed by the demultiplexer 265. The wavelength management unit 267 produces an upper-stream wavelength management table based on the thus-input upper-stream optical signals at respective wavelengths, and accordingly administrates upper-stream communication wavelengths (the upper-stream refers to a portion of the system upstream of the exchange node (i.e., on the side of the star coupler)). A vacant wavelength is selected from those lower-stream and lower-stream wavelength management tables, and the vacant communication wavelength to be used is notified to each node $11-nn_n$, using the control channel (in the lower-stream case) or the communication and control channels (in the upper-stream case). Thus, transmission and receiving wavelengths to be transmitted from the transmitter and received by the receiver are determined. The communication operation among the nodes in a common node group downstream of each exchange node is different from the communication operation between the nodes in different node groups.

As intra-group node communication, a case where a signal is transmitted from the node 11 to the node 13 will be described, by way of example. When communication is requested by the terminal equipment connected with the node 11, the node 11 supplies communication demand information from the communication control unit 310 to the communication control unit 261 in the exchange node 101, using the control channel. The communication control unit 261 selects a vacant wavelength from the lower-stream wavelength management table stored in the wavelength management unit 267 (for example, a vacant wavelength $\lambda_2$), and notifies the node 11 and the node 13 of the selected vacant wavelength information, using the control channel of the wavelength $\lambda_a$. The communication control unit 310 in the signal-transmitting node 11 controls the tunable optical transmitter 305, and adjusts its transmission wavelength to the notified vacant wavelength $\lambda_2$.

On the other hand, the communication control unit 310 in the signal-receiving node 13 controls the tunable filter 309 and sets its center transmission wavelength to the notified vacant wavelength $\lambda_2$. After the adjustment of the tunable filter 309 is finished, the communication control unit 310 in the receiving node 13 supplies communication start information to the exchange node 101 through the control channel to notify the transmitting node 11 of the fact that the node 13 is prepared to receive a signal from the node 11. Further, the communication start information is transmitted to the node 11 through the control channel, and then the transmitting node 11 starts to perform communication.

The optical signal at $\lambda_2$ output from the tunable transmitter 305 in the transmitting node 11 is supplied to the up optical fiber 120 through the multiplexer 303 and the output terminal 301. The optical signal transmitted through the up optical fiber 120 and input into the input terminal 201 of the exchange node 101 is demultiplexed by the demultiplexer 241 and input into the star coupler 262. The optical signal input into the star coupler 262 is divided into $(n_k+1)$ portions, and those divided portions are input into the multiplexers $251-25n_k$ and the demultiplexer 264. The optical signals passed through the multiplexers $251-25n_k$ are input into the respective nodes $11-1n_1$ through the communication channel in the down optical fiber 120, and each signal at $\lambda_2$ is input into the tunable filter 309 through the demultiplexer 304. The center transmission wavelength of the tunable filter 309 in the receiving node 13 is already set at $\lambda_2$, SO that the optical signal at $\lambda_2$ can be transmitted through the tunable filter 309 and received by the optical receiver 308.

In contrast, the optical signals at $\lambda_2$ input into the other nodes 11, 12, and $14-1n_1$ are lost there since the tunable filters 309 therein are not adjusted to $\lambda_2$. Further, the optical signal at $\lambda_2$ input into the demultiplexer 264 in the exchange node 101 is demultiplexed and input into the wavelength converter 232 and the wavelength management unit 267. The optical signal at $\lambda_2$ input into the wavelength converter 232 is lost there. Since the wavelength management unit 267 receives the optical signal at $\lambda_2$, the wavelength management unit 267 renews the lower-stream wavelength management table to the effect that the wavelength $\lambda_2$ is used or occupied. Thus, the intra-group communication is effected.

Next, inter-group communication will be described. A case where communication is conducted from the transmitting node 11 to the receiving node 32 will be described, by way of example. When communication is ordered from the terminal equipment connected with the node 11, the transmitting node 11 supplies communication demand information to the communication control unit 261 in the exchange node 101, using the control line in the up optical fiber 120. The communication control unit 261 selects a vacant wavelength (for example, $\lambda_2$) from the lower-stream wavelength management table in the wavelength management unit 267, and the selected wavelength information is transmitted to the node 11 through the control channel in the down optical fiber 120.

Further, the wavelength management unit 267 in the exchange node 101 selects a vacant wavelength (for example, $\lambda_3$) from the upper-stream wavelength management table, and the wavelength converter 232 is controlled such that the converter 232 converts a signal at $\lambda_2$ to a signal at $\lambda_3$. The communication control unit 310 in the transmitting node 11, which receives the transmission vacant wavelength information from the exchange node 101, controls the tunable optical transmitter 305 and sets its transmission wavelength to the vacant wavelength $\lambda_2$. After the adjustment of the transmitter 305, the communication control unit 310 supplies to the tunable optical transmitter 305 a repetitive signal including an address (11) of the transmitting node 11 and an address (32) of the receiving node 32, and the tunable optical transmitter 305 converts this repetitive signal to an optical signal at $\lambda_2$ and outputs it. The optical signal output from the tunable transmitter 305 is supplied to the up optical fiber 120 through the multiplexer 303 and the output terminal 301. The optical signal transmitted through the up optical fiber 120 and input into the input terminal 201 of the exchange node 101 is demultiplexed by the demultiplexer 241 and input into the star coupler 262. The input optical signal at $\lambda_2$ is divided into $(n_k+1)$ portions and those divided portions are input into the multiplexers $251-25n_k$ and the demultiplexer 264. The optical signals transmitted through the multiplexers $251-25n_k$ are input into the respective nodes $11-1n_1$ through the communication channel in the down optical fiber 120 and lost there.

On the other hand, the optical signal input into the demultiplexer 264 is demultiplexed and input into the wavelength management unit 267 and the wavelength converter 232. The wavelength management unit 267, which receives the optical signal at $\lambda_2$, renews the lower-stream wavelength management table. The optical signal at $\lambda_2$ input into the wavelength converter 232 is converted to an optical signal at $\lambda_3$, and the signal at $\lambda_3$ is transmitted to the communication channel in the up optical fiber 121 through the tree coupler 266 and the output terminal 210. The optical signal transmitted through the up optical fiber 121 is divided by the star coupler 110, and the divided signals at $\lambda_3$ are input into the respective exchange nodes $101-10n$ through the communication channel in the down optical fiber 121. The optical signal at $\lambda_3$ input through the input terminal 200 of each exchange node is demultiplexed by the demultiplexer 265, output through its port of a wavelength $\lambda_3$ and input into the wavelength converter 223 and the wavelength management unit 267. The wavelength management unit 267 renews the upper-stream wavelength management table and at the same time detects the destination address (i.e., the address of the node 32). In the exchange nodes 101, 102 and $104-10n$ other than the exchange node 103, the signal is not connected to the down optical fiber 120 and lost there, since the destination or receiving node 32 is not connected with those exchange nodes.

In the exchange node 103, since the destination node 32 is connected with the exchange node 103, the wavelength management unit 267 controls the wavelength converter 223 such that the optical signal at $\lambda_3$ can be converted to a signal at such a wavelength (for example, $\lambda_5$) that is not used in the lower-stream, and this signal at $\lambda_5$ is output. At the same time, the communication control unit 261 notifies the communication control unit 310 in the node 32 of an assigned wavelength (i.e., $\lambda_5$), using the control channel. The optical signal at $\lambda_5$ output from the wavelength converter 223 is combined with the optical signals from the other wavelength converters by the tree coupler 263, divided by the star coupler 262 and input into the multiplexers $251-25n_k$ and the demultiplexer 264. The optical signals transmitted through the respective multiplexers are supplied through the respective output terminals $211-21n_k$ and input into the respective nodes $31-3n_3$ through the communication channel in the down optical fiber. The optical signal at $\lambda_5$ input through the input terminal 302 of each node $31-3n_3$ is demultiplexed by the demultiplexer 304 and input into the tunable filter 309. Here, the communication control unit 310 in the receiving node 32 is notified of the assigned vacant wavelength ($\lambda_5$) by the communication control unit 261 in the exchange node 103, using the control channel, and the tunable filter 309 is controlled such that its center wavelength is set to the notified wavelength ($\lambda_5$). After the center wavelength of the tunable filter 309 is thus adjusted, the input optical signal at As is transmitted through the tunable filter 309 and received by the optical receiver 308 in the node 32. In contrast, the optical signals at $\lambda_5$ input into the other nodes 31, $33-3n_3$ are lost there since the center wavelengths of the tunable filters 305 therein are not adjusted to $\lambda_5$.

As discussed above, a series of communication channels from the node 11 to the node 32 is established. To begin communication, when the repetitive signal is received by the optical receiver 308 in the receiving node 32, the communication control unit 310 notifies the communication control unit 261 in the exchange node 103 of the signal reception, using the control channel in the up optical fiber 120. Based thereon, the communication control unit 261 in the exchange node 103 orders the wavelength management unit 267 to convert the optical signal at $\lambda_5$ input into the wavelength converter 235 to a signal at an upper-stream vacant wavelength (for example, $\lambda_6$). The optical signal at As output from the wavelength converter 225 is transmitted to the wavelength converter 235 through the tree coupler 263, the star coupler 262 and the demultiplexer 264, so that the wavelength converter 235 converts this signal to an optical signal at $\lambda_5$ and outputs this converted signal. The repetitive signal at $\lambda_5$ output from the wavelength converter 235 is combined to the optical signals from the other wavelength converters $231-234$ and $236-23i$ by the tree coupler 266, and the combined signals are transmitted to the up optical fiber 121 through the output terminal 210. The optical signal at $\lambda_5$ transmitted through the communication channel in the up optical fiber 121 is divided by the star coupler 110, and the divided signals are input into the exchange nodes $101-10n$ through the down optical fiber 121. The optical signal at $\lambda_6$ input through the input terminal 200 of each exchange node $101-10n$ is demultiplexed by the demultiplexer 265, and the demultiplexed signals are input into the wavelength converters $221-22i$ and the wavelength management unit 267. When the wavelength management unit 267 in the exchange node 101 detects the address in the input signal, the exchange node 101 can recognize that the signal output from the transmitting node 11 is returned from the destination exchange node since the departure address is an address of the node 11 connected to the exchange node 101.

Therefore, the wavelength management unit 267 in the exchange node 101 notifies the node 11 of transmission start information, from the communication control unit 261, using the control channel. The communication control unit 310 in the node 11, which receives the transmission start information through the control channel, stops the transmission of the repetitive signal of the address information, and causes the tunable optical transmitter 305 to output the signal supplied from the terminal equipment connected to the node 11. This data signal is transmitted to the node 32 through the above-described series of communication channels and received thereby. In contrast, in the wavelength management units 267 in the other exchange nodes 102–10n, the repetitive signal is lost there since the destination address is that belonging to other group. Thus, the inter-group communication is effected.

Other inter-node communication operation is similarly conducted. In this embodiment, the communication channels are wavelength division multiplexing channels, but other multiplexing systems including a polarity of channels may be used. Further, there is no need to wavelength-multiplex the communication channels and the control channel, and instead those channels may be spatially separated. Further more, the network structure is not limited to one illustrated in FIG. 1, but other configurations may be used only if each group of nodes are connected to an exchange node and a plurality of exchange nodes are connected with each other.

The construction of the exchange node is also not limited to what is illustrated in FIG. 2, but other structures may be used if the exchange node includes at least a communication control means for performing communication of the control signal with a node connected to the exchange node, a means for transmitting signals in multiplexed channels from the input terminals to all or desired output terminals and a means for monitoring the use situation of the multiplexed channels.

Further, the structure of the node is also not limited to what is illustrated in FIG. 3, but other structures may be used if the node includes at least a communication control means for performing communication of the control signal, a means for transmitting a signal to at least one channel of multiplexed channels and a means for receiving a signal from at least one channel of the multiplexed channels.

Second Embodiment

A second embodiment of the present invention will be described with reference to FIG. 4. FIG. 1 illustrates the structure of a wavelength division multiplexing network of this embodiment. In FIG. 4, reference numeral 400 designates a star coupler, reference numerals 401, 402, ..., 40n respectively designate exchange nodes and reference numerals 411, 412, ..., 4nn$_n$ respectively designate nodes. Each of the nodes 411–4nn$_n$ includes a transceiver portion for wavelength division multiplexing communication channels and a transceiver portion for the control channel. The transceiver portion for wavelength division multiplexing communication channels is comprised of an optical transmitter including a tunable laser diode and an optical receiver including a tunable filter, for example. The transceiver portion for the control channel is comprised of a communication circuit of a conventional LAN, such as FDDI, for example. Each of the exchange nodes 401–40n is comprised of a wavelength converter portion for wavelength-converting a signal in the wavelength division multiplexing channels and a transceiver portion for the control channel for performing communication of the control signal among the nodes 411–4n nn and the exchange nodes 401–40n.

Each of the exchange nodes 401–40n divides a signal from a node to signals to the other nodes in the case of intra-group communication which is performed among a group of nodes directly connected with an exchange node. In the case of communication to a group of nodes connected with another exchange node, a signal from a transmitting node is converted to a signal at a desired wavelength and output to the upper stream (towards the star coupler 400), and the signal from the upper stream is wavelength-converted and delivered to the lower stream (towards a receiving node).

Each of the nodes 411–4nn$_n$ is connected to one of the exchange nodes 401–40n through up and down optical fiber transmission lines 501. The exchange nodes 401–40n are connected with the star coupler 400 through up and down optical fiber transmission lines 502. The exchange nodes 401–40n and the nodes 411–4nn$_n$ are serially connected with each other through an optical fiber 503 in a loop form. The lines 502, which are connected about the star coupler 400 in a tree form, contain wavelength division multiplexing channels. In each node group (for example, a group of the nodes 411–41n$_1$) downstream of the exchange nodes 401–40n, communication is conducted using channels of i wavelengths. Also among the exchange nodes 401–40n, communication is similarly performed, using channels of i wavelengths.

In the wavelength division multiplexing channels, the nodes in each node group use the channels of i wavelengths in common, so wavelength assignment is conducted prior to communication. The wavelength assignment is conducted using a control channel in the control line 503 provided in a loop form, and communication wavelength to be used is notified from a node or an exchange node, which manages the communication wavelength. Accordingly, communication is performed through the notified wavelength-multiplexed communication channels. In the following description, the node 411 is assumed to conduct the wavelength management.

The intra-group communication operation will be described. A case where communication is performed from the node 431 connected with the exchange node 403 to the node 433 in the same node group will be described, for example. Initially, communication demand is transmitted from the transmitting node 431 to the wavelength management node 411. Communication request information (addresses of the transmitting node 431 and the receiving node 433) is supplied to the control line 503, and input into the wavelength management node 411 through the intermediate nodes 42n$_2$–421 and 41n$_1$–412. The wavelength management node 411 manages communication wavelengths of the wavelength division multiplexing channels and selects a vacant wavelength from the wavelength-multiplexed channels belonging to the group of the nodes 431–43n$_3$ connected with the exchange node 403. The node 411 notifies the node 431 and the node 433 of the thus-selected wavelength, using the control line 503. Further, the exchange node 403 is notified of the assigned communication wavelength and the fact that the intra-group communication is to be effected, using the control line 503.

In the transmitting node 431, the transmission wavelength of its transmitter is adjusted to the notified vacant wavelength. In the receiving node 433, the receiving wavelength of its receiver is also set to the notified vacant wavelength. Data signal transmitted from the node 431 to the assigned channel is input into the exchange node 403 through the up optical fiber transmission line 501. Because of the intra-group communication, the exchange node 403 dose not connect the signal to the upper stream, and instead connects the data signal to the nodes 431–43n$_3$ located downstream of the exchange node 403, without changing the communication wavelength. The signal is transmitted through the down optical fiber 501 and input into the respective nodes 431–43n$_3$. In the node 433, the receiving wavelength is already adjusted, so that the data signal from the transmitting node 431 is received. In the other nodes 431, 432, and 434–43n$_3$, the receiving wavelength is not adjusted, so the signal can not be received and is lost there. Other intra-group communication is also performed in the same manner.

Next, the inter-group communication will be described. For example, a case where communication is performed from the transmitting node 412 connected with the exchange node 401 to the receiving node 423 connected with the exchange node 402 will be described. Initially, the node 412 orders the wavelength management node 411 to start communication. Communication demand information including addresses of the transmitting node 412 and the receiving node 423 is transmitted to the control line 503, and input into the wavelength management node 411. The wavelength management node 411 notifies the transmitting node 412 and the exchange node 401 of a vacant communication wavelength belonging to the group of nodes 411–41$n_1$ connected with the exchange 401, using the control line 503. The wavelength management node 411 also notifies the receiving node 423 and the exchange node 402 of a vacant wavelength belonging to the group of nodes 421–42$n_2$ connected with the exchange 402, using the control line 503, and notifies the exchange node 401 and the exchange node 402 of a vacant wavelength belonging to the upper stream of the exchange nodes 401–40$n$, using the control line 503, The transmitting node 412 sets the transmission wavelength of its transmitter to the notified vacant wavelength, and the receiving node 423 also sets the receiving wavelength of its receiver to the noticed vacant wavelength. Data signal transmitted from the node 412 to the assigned channel of the wavelength-multiplexed channels is input into the exchange node 401 through the optical fiber transmission line 501, and converted to a signal at the upper-stream vacant wavelength in the exchange node 401. The thus-converted signal is transmitted to the upper stream optical fiber transmission line 502 from the exchange node 401. The optical signal is divided by the star coupler 400, and the divided signals are supplied to all of the exchange nodes 401–40$n$. In the exchange nodes other than the exchange node 402, the optical signal from the star coupler 400 is not received and lost there. In the exchange node 402, the input signal is further converted to a signal at the noticed vacant wavelength belonging to the group of the nodes 421–42$n_2$ connected with the exchange node 402, and supplied downstream of the exchange node 402. Thus, the data signal is transmitted to the respective nodes 421–42$n_2$ in the node group connected with the exchange node 402. In the node 423, since the receiving wavelength is already properly set, the signal transmitted from the transmitting node 412 via the exchange node 401, the star coupler 400 and the exchange node 402 is received. In the other nodes 421, 422 and 424–42$n_2$, the receiving wavelength is not adjusted, so that the signal is not received and lost there. Thus, the inter-group communication is effected. Other inter-group communication is also performed similarly.

In this embodiment, the communication channels in the transmission lines 501 and 502 are wavelength-multiplexed channels, but other multiplexing system having a plurality of channels may be used. Further, the network configuration is not limited to what is illustrated in FIG. 4, and other structures may be used if plural nodes are connected with an exchange node and plural exchange nodes are connected with each other. In the wavelength multiplexing network of the second embodiment, the wavelength assignment in the communication channels is performed using the loop-shaped control line 503, and the wavelength management node conducts the wavelength management in a concentrated fashion. However, wavelength-multiplexed channels and the control channel are provided in separate transmission lines in this embodiment, so that the transmission line distribution becomes complicated and cost therefor might increase.

As a system for using a common transmission line as the wavelength-multiplexed line and the control line, a system as described in the first embodiment exists in which the signal wavelength in the control channel differs from the signal wavelengths in the wavelength-multiplexed channels and those signals are wavelength-multiplexed. In the second embodiment in which a loop-type LAN is used as the control line, wavelength multiplexing of the control line and the tree-type wavelength multiplexing line may be difficult. In the first embodiment, that difficulty is overcome.

Third Embodiment

A third embodiment of the present invention will now be described. In the first and second embodiments, transmission and receiving wavelengths are tunable, but in the third embodiment, the transmission wavelength is fixed and only the receiving wavelength is tunable. Constructions of network, exchange node and node in this embodiment are the same as those in the first embodiment. Different transmission wavelengths are assigned beforehand to the respective nodes in the lower stream of the exchange node. For example, $\lambda_1$ is assigned to the nodes 11, 21, . . . , $n$1, $\lambda_2$ is assigned to the nodes 12, 22, . . . , $n$2 and $\lambda_{n1}$, $\lambda n$2, . . . , $\lambda nn$ are respectively assigned to the nodes 1$n_1$, 2$n_2$, . . . , $nn_n$. To pre-set the transmission wavelengths, the tunable optical transmitter 305 may be controlled, or the tunable optical transmitter 305 may be replaced by an optical transmitter having a fixed wavelength. The communication operation of the third embodiment is the same as the first embodiment, except that the exchange node of this embodiment does not perform assignment of the transmission wavelength.

Similar modification of this embodiment can also be made in the second embodiment. In this case, the communication operation is the same as in the second embodiment, except that the wavelength management node of the modified second embodiment does not conduct assignment of the transmission wavelength.

Fourth Embodiment

A fourth embodiment of the present invention will now be described. In the fourth embodiment, the receiving wavelength is fixed and only the transmission wavelength is tunable.

Constructions of the network, exchange nodes and nodes are the same as those in the first embodiment. Different receiving wavelengths are assigned beforehand to the respective nodes in the lower stream of the exchange node. For example, $\lambda_1$ is assigned to the nodes 11, 21, . . . , $n$1, $\lambda_2$ is assigned to the nodes 12, 22, . . . , $n$2 and $\lambda_n$ is assigned to the nodes 1$n_1$, 2$n_2$, . . . , $nn_n$. To pre-set the receiving wavelength, the tunable filter 309 may be controlled, or the tunable filter 309 may be replaced by a filter having a fixed transmission wavelength.

Initially, the intra-group communication will be described. In this embodiment, since the receiving wavelength is fixed, the transmission node adjusts the transmission wavelength to the wavelength assigned to the receiving or addressed node to start communication. If, however, a plurality of the transmission nodes are to transmit signals to the same receiving node simultaneously, signal collision will occur. Therefore, the exchange node notifies the transmitting node, which orders start of communication, of communication allowance, using the control channel, only when no other communication is not being performed toward that receiving node. Here, the transmitting node may be beforehand notified of the fixed receiving wavelength of the receiving node, or may be noticed from the exchange node every time communication will be started. Other intra-group communication operation is the same as the first embodiment.

The inter-group communication will now be described. Similar to the first embodiment, the transmitting node adjusts the transmission wavelength in response to instruction from the exchange node, and transmits the repetitive signal including the address of the receiving node. The exchange node connected with the addressed receiving node detects the address of the receiving node, and converts the signal to an optical signal at the wavelength assigned to the addressed receiving node. The thus-converted optical signal is supplied to the receiving node from the exchange node. Other inter-group communication operation is the same as in the first embodiment.

Modifications of this embodiment can also be made as in the second embodiment. In this case, the communication operation is the same as in the second embodiment, except that the wavelength management node of the modified second embodiment does not conduct assignment of the receiving wavelength.

Fifth Embodiment

A fifth embodiment of the present invention will now be described. In the fifth embodiment, the exchange node does not convert the wavelength of a signal.

Constructions of the network, exchange nodes and nodes are the same as those in the first embodiment. In order not to execute wavelength conversion, the wavelength converters 221–22i and 231–23i are set such that wavelength conversion cannot be effected, or the wavelength converter may be replaced by a device without any wavelength conversion function, such as an optical amplifier, or the demultiplexer 265 and the demultiplexer 264 may be respectively connected with the tree coupler 263 and the tree coupler 266 through optical fibers without using any wavelength converters and optical amplifiers.

The intra-group communication operation is the same as in the first embodiment.

Next, the inter-group communication will be described. In the inter-group communication, since no wavelength conversion is performed in the exchange node, all optical signals at wavelengths used in the upper and lower streams are input into the wavelength management unit 267. Therefore, in response to the communication demand from the transmitting node, the wavelength management unit 267 selects a common vacant wavelength from the upper and lower stream wavelength management tables, and notifies the transmitting node of the assigned wavelength, using the control channel. The transmitting node transmits the repetitive signal at the assigned vacant wavelength including addresses of the transmitting node and the receiving node. No wavelength conversion is conducted also in the exchange node connected with the receiving node. Instead, this exchange node detects the address of the receiving node and notifies the addressed receiving node of the communication wavelength, using the control channel. After the receiving node is prepared to receive a signal and receives that repetitive signal from the transmitting node, the receiving node notifies the exchange node connected with the transmitting node of this fact, through the exchange node connected with the receiving node, using another vacant wavelength. The exchange node connected with the transmitting node confirms the return of the repetitive signal, and instructs the transmitting node to start transmission of data signal, using the control channel. Here, the transmitting node stops the transmission of the repetitive signal, and then starts the transmission of the data signal, using a communication channel of the common vacant wavelength. Other communication operation is the same as the first embodiment.

Modifications of this embodiment can also be made as in the second embodiment. In this case, the communication operation is the same as in the second embodiment, except that the exchange node of the modified second embodiment does not conduct wavelength conversion.

As described in the foregoing, in a communication network according to this invention, the control channel is disposed between the nodes and the exchange nodes and channel assignment is conducted using at least the control channel to perform communication operation.

Further, in a construction in which the control channel is disposed only between the nodes and the exchange node and the control channel and the multiplexed communication channels are multiplexed, the transmission line distribution is simplified and communication operation can be simplified by performing channel assignment using both of the control channel and the multiplexed channel. Thus, time for establishing a series of communication channels can be shortened.

Except as otherwise disclosed herein, the various components shown in outline or block form in the Figures are individually well known in the optical communication device and optical communication arts, and their internal construction and operation are not critical either to making or using this invention, or to a description of the best mode of the invention.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A communication network comprising:
   a plurality of groups of nodes, each of said groups including at least a node; and
   a plurality of exchange nodes for performing exchange of communications of nodes within a single group in the said plurality of groups of nodes and performing exchange of communications among said groups of nodes,
   wherein each said exchange node includes:
      first connecting means for connecting nodes within the single group;
      second connecting means for connecting the exchange nodes; and
   communication channel setting means for performing processing to set a communication channel by using a control channel, or processing to set the communication channel without using the control channel, in accordance with whether the communication channel is to be set to be used for communication with another exchange node or to be used for communication with a node to be connected by said first connecting means.

2. A communication network according to claim 1, wherein said control channel connects said nodes and said exchange nodes in parallel with said communication channel that connects said nodes and said exchange node.

3. A communication network according to claim 1, wherein said communication channel setting means communicates a control signal with said other exchange node by using the communication channel.

4. A communication network according to claim 1, wherein said exchange node notifies a communication channel used for communication of a communication signal by a control signal, and notifies communication start information for requesting starting of communication among said nodes and said exchange nodes by the control signal.

5. A communication network according to claim 1, wherein said exchange node notifies address information of a receiving node which receives a communication signal and address information of a transmission node which transmits a communication signal by a control signal.

6. A communication network according to claim 1, further comprising:
    first selection means for selecting a communication channel, established among said exchange nodes, from among the plurality of communication channels; and
    second selection means for selecting a communication channel, established between said exchange nodes and nodes, from among the plurality of communication channels,
        wherein said first and second selection means select a communication channel independently of each other.

7. A communication network according to claim 1, wherein said nodes and said exchange nodes are connected with each other, and said exchange nodes are connected with each other, by a plurality of communication channels by a wavelength multiplexed communication channel in which a plurality of wavelengths are multiplexed.

8. A communication network according to claim 7, wherein said exchange nodes are able to communicate among said exchange nodes and between said exchange nodes and with nodes having a different wavelength.

9. A communication network according to claim 1, wherein said nodes and said exchange nodes are connected with each other, and said exchange nodes are connected with each other, by a plurality of communication channels which are separated spatially.

10. A method for controlling a communication network which includes a plurality of groups of nodes, each of said groups including at least a node, and a plurality of exchange nodes for performing exchange of communications of nodes within a single group in the said plurality of groups of nodes and performing exchange of communications among said groups of nodes, said method comprising the steps of:
    in one of the exchange nodes, using first connecting means for connecting nodes within the single group;
    in that one of the exchange nodes, using second connecting means for connecting the exchange nodes; and
    in that one of the exchange nodes, performing processing to set a communication channel by using a control channel, or processing to set the communication channel without using the control channel, in accordance with whether the communication channel is to be set to be used for communication with another exchange node or to be used for communication with a node to be connected by the first connecting means.

11. An exchange node which can be connected to a communication network which includes a plurality of groups of nodes, each of said groups including at least a node and a plurality of exchange nodes for performing exchange of communications of nodes within a single group in the said plurality of groups of nodes and performing exchange of communications among said groups of nodes, said exchange node comprising:
    first connecting means for connecting nodes within the single group;
    second connecting means for connecting the exchange nodes; and
    communication channel setting means for performing processing to set a communication channel by using a control channel, or processing to set the communication channel without using the control channel, in accordance with whether the communication channel is to be set to be used for communication with another exchange node or to be used for communication with a node to be connected by said first connecting means.

12. An exchange node according to claim 11, wherein said control channel connects said nodes and said exchange nodes in parallel with said communication channel which connects said nodes and said exchange nodes.

13. An exchange node according to claim 11, wherein said communication channel setting means communicates a control signal with said other exchange node by using the communication channel.

14. An exchange node according to claim 11, wherein said exchange node notifies a communication channel used for communication of a communication signal by a control signal, and notifies communication start information for requesting starting of communication among said nodes and said exchange nodes, by a control signal.

15. An exchange node according to claim 11, wherein said exchange node notifies address information of a receiving node which receives a communication signal and address information of a transmission node which transmits a communication signal among said exchange nodes by a control signal.

16. An exchange node according to claim 11, further comprising:
    first selection means for selecting a communication channel, established among said exchange nodes, from among a plurality of communication channels; and
    second selection means for selecting a communication channel, established between said exchange nodes and nodes, from among a plurality of communication channels,
        wherein said first and second selection means select a communication channel independently of each other.

17. An exchange node according to claim 11, wherein said nodes and said exchange nodes are connected with each other, and said exchange nodes are connected with each other, by a plurality of communication channels by a wavelength multiplexed communication channel in which a plurality of wavelengths are multiplexed.

18. An exchange node according to claim 17, wherein said exchange nodes are able to communicate among said exchange nodes, and between said exchange nodes and nodes with a different wavelength.

19. An exchange node according to claim 11, wherein said nodes and said exchange nodes are connected with each other, and said exchange nodes are connected to each other, by a plurality of communication channels which are separated spatially.

20. A method for controlling an exchange node which can be connected to a communication network which includes a plurality of groups of nodes, each of said groups including at least a node; and a plurality of exchange nodes for performing exchange of communication nodes with a single group in the said plurality of groups of nodes and performing exchange of communications among said groups of nodes, said method comprising the steps of:

in one of the exchange nodes, using first connecting means for connecting nodes within the single group;

in that one of the exchange nodes, using second connecting means for connecting the exchange nodes; and in that one of the exchange nodes, performing processing to set a communication channel by using a control channel, or processing to set the communication channel without using the control channel, in accordance with whether the communication channel is to be set to be used for communication with another exchange node or to be used for communication with a node to be connected by the first connecting means.

* * * * *

UNITED STATES PATENT AND TRADEMARK OFFICE
CERTIFICATE OF CORRECTION

PATENT NO.    : 6,385,206 B1
DATED         : May 7, 2002
INVENTOR(S)   : Toru Nakata It is certified that error appears in the above-identified patent and that said Letters Patent is hereby corrected as shown below:

<u>Title page,</u>
Item [56], U.S. PATENT DOCUMENTS, insert
-- 5,173,794   12/1992   Cheung et al. .......... 359/127 --.

<u>Drawings,</u>
Sheet 2, FIG. 2 "DEMULTILEXER" should read -- DEMULTIPLEXER --.

<u>Column 5,</u>
Line 51, "assigned" (second occurrence) should read -- selected --.

<u>Column 8,</u>
Line 36, "$\lambda-\lambda_1$" should read -- $\lambda_1-\lambda_1$ --.

<u>Column 9,</u>
Line 4, "illustration)" should read -- illustration.) --; and
Line 51, "lower-stream" should read -- upper-stream --.

<u>Column 10,</u>
Line 38, "SO" should read -- so --.

<u>Column 12,</u>
Lines 14 and 32, "As" should read -- $\lambda_5$ --;
Lines 36, 37 and 42, "$\lambda_5$" should read -- $\lambda_6$ --.

<u>Column 13,</u>
Line 9, "polarity" should read -- plurality --;
Line 13, "Further more," should read -- Furthermore, --;
Line 35, "FIG. 1" should read -- FIG. 4 --; and
Line 55, "nodes 411–*n nn*" should read -- nodes 411–4nn$_n$ --.

<u>Column 14,</u>
Line 56, "dose" should read -- does --.

<u>Column 15,</u>
Line 17, "exchange 402," should read -- exchange node 402, --.

UNITED STATES PATENT AND TRADEMARK OFFICE
CERTIFICATE OF CORRECTION

PATENT NO. : 6,385,206 B1
DATED : May 7, 2002
INVENTOR(S) : Toru Nakata

It is certified that error appears in the above-identified patent and that said Letters Patent is hereby corrected as shown below:

Column 16,
Line 22, "iS" should read -- is --;
Line 23, "λ$n$2, ... λ$nn$" should read -- $\lambda_{n2}$, ... $\lambda_{nn}$ --; and
Line 65, "not" should be deleted.

Column 17,
Line 1, "noticed" should read -- notified --.

Signed and Sealed this

Fifteenth Day of April, 2003

JAMES E. ROGAN
*Director of the United States Patent and Trademark Office*